United States Patent [19]

Ryan

[11] Patent Number: 4,830,246
[45] Date of Patent: May 16, 1989

[54] FARRIER'S NAIL-HOLDING DEVICE

[76] Inventor: Michael K. Ryan, 111 W. 9th St., #143, Clovis, Calif. 93612

[21] Appl. No.: 180,315

[22] Filed: Apr. 11, 1988

[51] Int. Cl.4 .......................... A44C 5/18; A45F 5/00; A01L 11/00
[52] U.S. Cl. .................. 224/221; 224/219; 224/249; 224/248; 224/242; 168/45
[58] Field of Search ............... 224/191, 218, 219, 220, 224/221, 222, 230, 231, 239, 242, 246, 247, 248, 249, 251, 267, 904, 918; 81/44; 24/3 A, 3 L; 206/338, 347, 348; 168/4, 17, 23, 45

[56] References Cited

U.S. PATENT DOCUMENTS

| | | | |
|---|---|---|---|
| 2,746,658 | 5/1956 | Freid | 224/221 |
| 2,926,631 | 3/1960 | Palmer | 224/221 |
| 3,272,412 | 9/1966 | Antonious | 224/249 |
| 4,325,504 | 4/1982 | Amani | 224/183 |

Primary Examiner—Henry J. Recla
Assistant Examiner—J. Casimer Jacyna

[57] ABSTRACT

A bracelet-like device adapted to be worn on a Farrier's wrist is provided for holding a multitude of horse shoe nails in an orderly array. The device utilizes arcuately shaped forward and rearward aligned members which secure the nails by frictional means. The nails are disposed in parallel juxtaposition with their heads forwardly directed, and pointed extremities rearwardly directed.

5 Claims, 3 Drawing Sheets

FARRIER'S NAIL-HOLDING DEVICE

BACKGROUND OF THE INVENTION

This invention concerns a device for holding a multitude of horse shoe nails in an orderly array, permitting easy dispensing for use by a farrier.

In the course of working upon the hooves of horses for the removal or replacement of a hose shoe, the farrier's hands are generally in active engagement with the hoof and with specialized tool required for the particular task. Accordingly, it is difficult for the farrier to have to reach any considerable or variable distance for necessary nails.

To facilitate easy access to the nails, farriers generally hold the nails in their mouth, or in pockets, holster belts, or work aprons. In order to ensure rapid and unerring obtention of the nails without looking away from the hoof, it is important that the nails be securely held at an unobstructed site close to the hoof. Unlike ordinary nails having a center axis of symmetry, horse shoe nails are comprised of a flat shank whose edges taper between a substantially rectangular head and an opposed pointed extremity. In some embodiments, one face of the shaft is different from the opposite face with respect to the angle of convergence with the head. Because of the specialized configuration of horse shoe nails, it is important that any means for holding them be capable of holding the nails in a fixed orientation.

It is therefore an object of the present invention to provide a device for securely holding a number of horseshoe nails in a fixed array.

It is another object of this invention to provide a device as in the foregoing object which can be worn by the farrier at an unobstructed site close to the work activity.

It is a further object of the present invention to provide a device of the aforesaid nature of rugged, durable construction amenable to low cost manufacture.

These objects and other objects and advantages of the invention will be apparent from the following description.

SUMMARY OF THE INVENTION

The above and other beneficial objects and advantages are accomplished in accordance with the present invention by a device of bracelet configuration adapted to be worn upon the farrier's wrist, said device comprising:

(a) a forward member comprising an arcuately shaped apertured structure having a concave lower boundary adapted to fit against the top of the farrier's wrist, a convex upper boundary directed away from the wrist, opposed side extremities, and a series of identical apertures equally spaced between said side extremities, (b) a rearward member of arcuate shape disposed in parallel, spaced apart alignment with said forward member, said rearward member being bounded by upper and lower surfaces and opposed side extremities, said upper surface having retaining structure which follows the contour of said upper surface, (c) paired connecting members which join the aligned side extremities of said forward and rearward members, (d) frictional gripping means associated with said series of apertures, whereby (e) said apertures engage the shaft portions of the horse shoe nails, said gripping means cause said shaft portions to be in parallel juxtaposition, the pointed extremities of the nails contact said retaining structure, and the heads of the nails are disposed forwardly of said apertures, and (f) strap means associated with said paired connecting members, said strap means having size-adjusting means and quick-acting closure means adapted to cause the device to securely embrace the farrier's wrist.

In preferred embodiments of the invention, two series of aligned apertures are disposed in an upwardly-opening trough-like member bounded by front and rear apertured panels, and the gripping means is a coil spring disposed within said trough-like member. In further preferred embodiments, the retaining structure is a forwardly-opening trough-like member which protectively houses the pointed extremities of the nails. In certain embodiments, the forward and rearward members and paired connecting members may be portions of a monolithic structure fabricated of flat metal sheet stock by cutting and bending operations, or fabricated by plastic by a molding operation.

BRIEF DESCRIPTION OF THE DRAWING

For a fuller understanding of the nature and objects of the invention, reference should be had to the following detailed description taken in connection with the accompanying drawing forming a part of this specification and in which similar numerals of reference indicate corresponding parts in all the figures of the drawing.

DESCRIPTION OF THE PREFERRED EMBODIMENT

Figure 1:
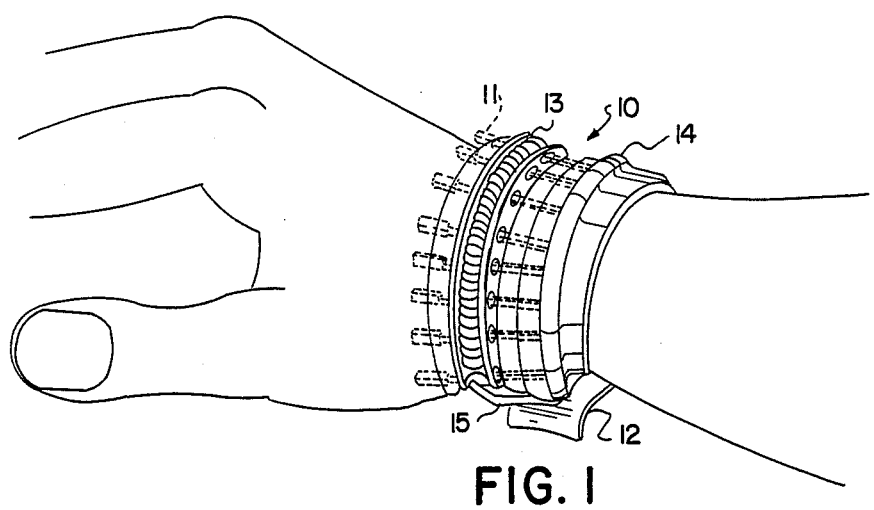
FIG. 1 is a perspective view of an embodiment of the device of this invention shown in its functional state loaded with horse shoe nails and emplaced upon a farrier's wrist.

Referring to FIGS. 1-5 of the drawing, an embodiment of the device 10 of the present invention is shown holding a number of horse shoe nails 11 in fixed array, and secured to the farrier's wrist by strap means 12.

The device is comprised of forward member 13 and rearward member 14 held in parallel spaced apart alignment by paired connecting members 15. Forward member 13 is comprised of arcuately shaped trough 16 bounded by forward apertured panel 17, rear apertured panel 18 and connecting floor panel 19, said forward and rear panels being disposed parallel to each other and perpendicular to said floor panel. Trough 16 terminates at opposed side extremities 20. The cross-sectional configuration of trough 16 is constant between side extremities 20. Each of panels 17 and 18 contain a series of identical apertures 21 equally spaced apart between side extremities 20. The apertures of the two panels are aligned such that coaxial straight lines can be drawn through the centers of opposing apertures, said straight lines lying in planes substantially perpendicular to panels 17 and 18.

Floor panel 19 has an arcuate curvature, the downwardly directed surface 22 of said panel having a concave contour adapted to fit against the top of a farrier's wrist. Upper edges 23 of panels 17 and 18 have a convex curvature which parallels the contour of surface 22.

Rearward member 14 is comprised of arcuate flat panel 24 bounded by side extremities 25, convexly shaped upper surface 26 and concave lower surface 27. Retaining structure in the form of lip 28 is formed by the upward bending of panel 24 at its rearward edge 29, and is disposed above upper surface 26 to form a trough-like enclosure 30.

Paired connecting members 15, of substantially flat elongated construction, extend perpendicularly between the aligned side extremities of forward and rearward members 13 and 14, respectively, and join therewith to form an integrated frame structure. A flat piece of leather 44 or other soft compliant material is disposed beneath said frame structure to provide wearing comfort. In their aligned juxtaposition, flat panel 24 of rearward member 14 is substantially coplanar with floor panel 19 of forward member 13. Straight lines which may be defined by the centers of opposed apertures 21 enter trough-like enclosure 30. It is to be noted however, that the apertures of panel 17 are slightly elevated above their corresponding apertures in panel 18. As shown most clearly in FIG. 5, such positioning of the apertures causes the nails to be angularly disposed with respect to the frame structure, thereby elevating the heads 40 of the nails for easier accessibility.

Gripping means in the form of coil spring 31 is housed within trough 16. The extremities 32 of said spring are bent in hook-like configuration and attached to connecting members 15. In alternative embodiments, the gripping means may be a resilient plastic material disposed within trough 16 and having channels aligned with the two series of apertures. In still further embodiments, the gripping means may be integral with forward member 13 as a monolithic plastic structure having a series of oriented channels directed toward rearward member 14.

End extremities 15 are provided with elongated apertures 33 which serve to engage the anchored extremities 34 of compliant straps 12. The free extremity of one of said straps is provided with buckle means in the form of rectangular metal loop buckle 35. The outer surface 37 of the other strap is provided adjacent its free extremity with interactive Velcro attachment means 36, permitting the strap to be folded around buckle 35 and brought into securing contact back upon outer surface 37 closer to its anchored extremity 34.

Figure 6:
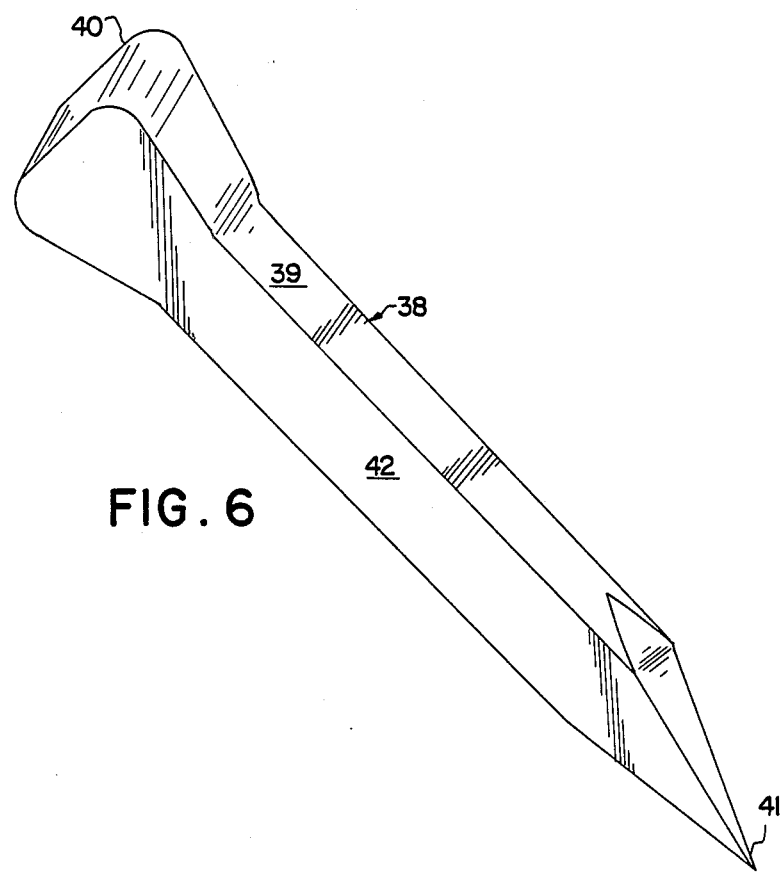
FIG. 6 is a perspective view of a typical horse shoe nail.
Figure 2:
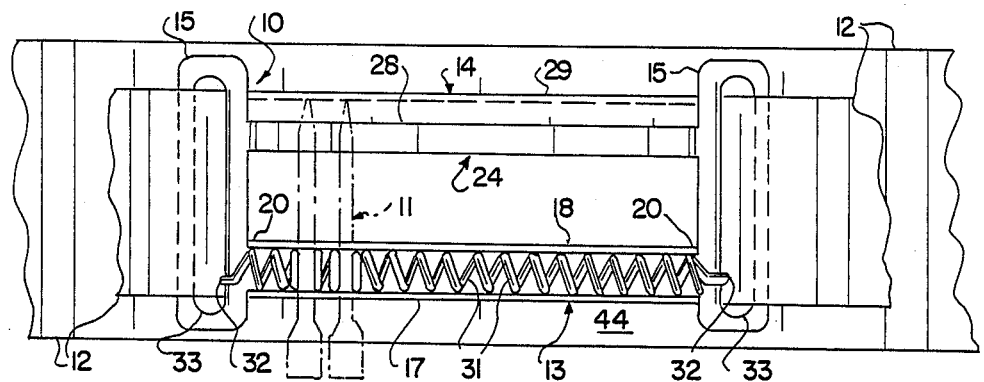
FIG. 2 is a top view of the embodiment of FIG. 1.
Figure 3:
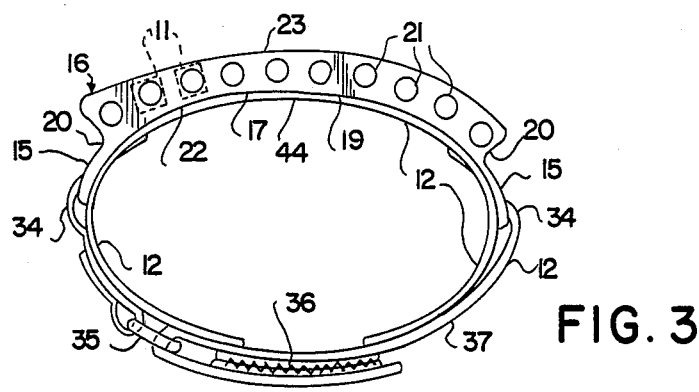
FIG. 3 is a front view thereof.
Figure 4:
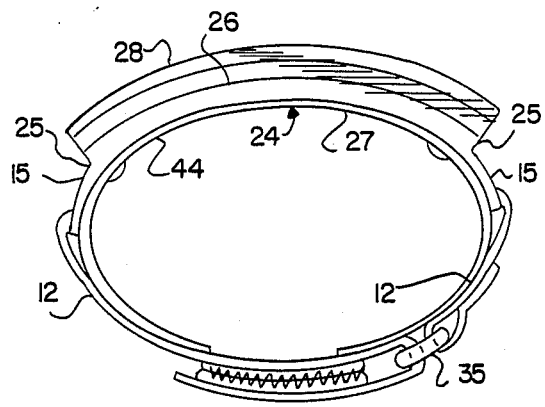
FIG. 4 is a rear view thereof.
Figure 5:
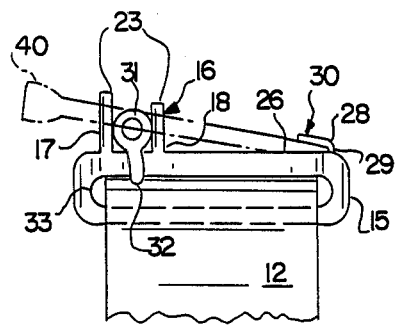
FIG. 5 is a side view thereof.

In use, a multitude of horse shoe nails, numbering between about 8 and 25 are held by the device. As shown in FIG. 6, the horse shoe nail is comprised of a shank 38 having opposed flat faces 42 whose side edges 39 taper between a substantially rectangular head 40, and an opposite pointed extremity 41. When inserted into the holder device, pointed extremities 41 are seated within trough-like enclosure 30, flat faces 42 are in facing parallel juxtaposition, and heads 40 are disposed equidistantly forwardly of apertured panel 17. The nails are thereby accommodated by the holder device in an oriented array which facilitates their quick and assured removal for use.

While particular examples of the present invention have been shown and described, it is apparent that changes and modifications may be made therein without departing from the invention in its broadest aspects. The aim of the appended claims, therefore, is to cover all such changes and modifications as fall within the true spirit and scope of the invention.

Having thus described my invention, what is claimed is:

1. A device of bracelet configuration for holding a multitude of horse shoe nails in an orderly array and adapted to be worn upon a farrier's wrist, said device comprising:
   (a) a forward member comprising an arcuately shaped apertured structure having a concave lower boundary adapted to fit against the top of the farrier's wrist, a convex upper boundary directed away from the wrist, opposed end extremities, and a series of identical apertures equally spaced between said end extremities,
   (b) a rearward member of arcuate shape disposed in parallel, spaced apart alignment with said forward member, said rearward member being bounded by upper and lower surfaces and opposed end extremities, said upper surface having retaining structure which follows the contour of said upper surface,
   (c) said end extremeties of each respective forward and rearward members being aligned, first and second connecting members connected, respectively, to said end extremities of said forward and rearward members such that said forward and rearward members are adapted to overlie a farrier's wrist
   (d) frictional gripping means associated with said series of apertures, whereby
   (e) said apertures engage the shaft portions of the horse shoe nails, said gripping means cause said shaft portions to be in parallel juxtaposition, the pointed extremities of the nails contact said retaining structure, and the heads of the nails are disposed forwardly of said apertures, and
   (f) strap means associated with said first and second connecting members and having size-adjusting means and quick-acting closure means for securing the device to the farrier's wrist.

2. The device of claim 1 wherein said forward member is shaped as an upwardly-opening trough bounded by front and rear apertured walls.

3. The device of claim 2 wherein said gripping means is a coil spring disposed within said trough.

4. The device of claim 1 wherein said retaining structure is a forwardly-opening trough-like member which protectively houses the pointed extremities of the nails.

5. The device of claim 1 wherein said forward and rewarward members and first and second connecting members are portions of a monolithic structure.

* * * * *